United States Patent [19]

Rhoads

[11] 4,274,369
[45] Jun. 23, 1981

[54] STRATIFIED CROSS COMBUSTION ENGINE

[76] Inventor: Jack L. Rhoads, P.O. Box 573, Taylor, Ariz. 85939

[21] Appl. No.: 71,987

[22] Filed: Sep. 4, 1979

[51] Int. Cl.³ .......................................... F02B 25/12
[52] U.S. Cl. .................................................. 123/53 A
[58] Field of Search ............................. 123/53 A, 53 R

[56] References Cited

U.S. PATENT DOCUMENTS

| | | | |
|---|---|---|---|
| 2,280,712 | 4/1942 | Mallory | 123/53 A |
| 3,866,582 | 2/1975 | Lagarde | 123/53 A |
| 4,106,445 | 8/1978 | Beveridge | 123/53 A |

FOREIGN PATENT DOCUMENTS 599396 10/1925 France .................... 123/53 A

Primary Examiner—Wendell E. Burns
Attorney, Agent, or Firm—Ralph S. Branscomb

[57] ABSTRACT

A piston engine is provided in which adjacent cylinder pairs share a common combustion chamber and the pistons are mounted to reciprocate substantially in phase, one of the pistons in each piston pair receiving a rich mixture which is ignited by a sparkplug in that cylinder, with the other cylinder in the cylinder pair being passive in its preferred form, and receiving through a separate intake valve either pure air or a leaner mixture into which the combusted richer mixture pours, insuring that the greatest combustion possible resulting in the greatest percentage of carbon dioxide formation as opposed to carbon monoxide is created.

1 Claim, 4 Drawing Figures

STRATIFIED CROSS COMBUSTION ENGINE

BACKGROUND OF THE INVENTION

The stratified charge engine operates on the principle that the fuel density required for ignition is too rich to result in the complete combustion of the hydrocarbon fuel into carbon dioxide, resulting in the production of a high proportion of carbon monoxide in the exhaust of conventional piston engines. The stratified charge engine, however, by providing a single combustion chamber within a single piston but designating one area of the combustion chamber as high density, or rich fuel mixture, and another as very lean, achieves the effect of igniting the rich portion of the mixture which subsequently expands into the lean portion, achieving successful ignition but simultaneously enabling the combustion of an overall mixture which is below the density required for efficient and reliable combustion by a spark.

Burning hydrocarbon fuel to carbon dioxide as opposed to carbon monoxide, which of course requires double the amount of oxygen, yields more than three times the heat per molecule of fuel burned. A side effect, of course, is a lower rate or smog emission. Because the stratified charge engine produces both more power and fewer emissions it falls within that unique category of inventions which have solved two apparently mutually antagonistic problems at once. Thus, the stratifed charged engine represents a significant step in the technological development of the piston engine. The invention disclosed herein is a further refinement of the stratified engine concept.

SUMMARY OF THE INVENTION

The instant invention utilizes the stratified charge concept but expands upon it by providing two separate cylinders, each having its separate piston, with the pistons being mounted on the crankshaft to operate substantially in phase. The two cylinders are connected by virtue of a boring in the cylinder head.

Both cylinders are provided with intake and exhaust valves and only one is provided with a sparkplug, so that into this cylinder a relatively rich fuel mixture can be delivered and into the cylinder lacking the sparkplug either a lean mixture or pure air can be introduced so that when the rich cylinder is fired, the pressure will deliver the burning gases through the boring in the cylinder head to be completely oxidized, ideally all the way to carbon dioxide, in the second cylinder.

DETAILED DESCRIPTION OF THE DRAWING

DETAILED DESCRIPTION OF THE PREFERRED EMBODIMENT

Figure 1:
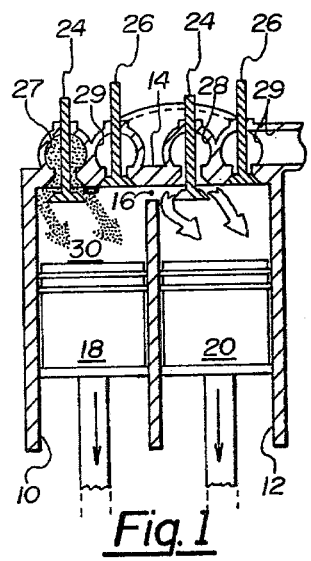
FIG. 1 is a somewhat diagrammatic illustration of a pair of pistons as they appear in the intake cycle.

As shown in all the figures 10 refers to the first cylinder, 12 refers to the second cylinder with the cylinder head being shown diagrammatically at 14, there being a substantial passageway 16 bored into the cylinder head. Disposed within the first cylinder is a first piston 18 and in the second cylinder is a second piston 20, these pistons being journaled on a common crankshaft 22 such that they are substantially in phase, or exactly in phase, as shown in the figures.

Figure 2:
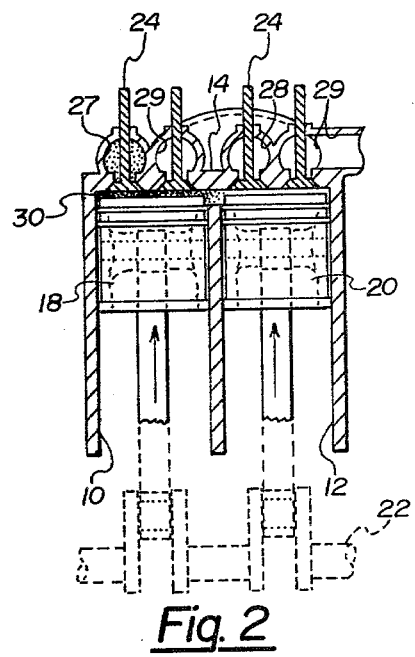
FIG. 2 is a view identical to FIG. 1 but in the compression cycle.

Each of the cylinders has a separate intake valve 24 and an exhaust valve 26, with suitable intake manifolds 27 and 28, respectively, and common exhaust manifold 29. The intakes are separately manifolded so that into the first cylinder is introduced a rich mixture indicated at 30, whereas in the second cylinder a lean mixture, or a mixture of air and water vapor, or even pure air, is introduced. It will be noted that prior to combustion there is no motive force which would commingle the gas in one cylinder with the gas in another, as throughout their compression cycle, shown in FIG. 2, the pressure will increase substantially at the same rate in both cylinders.

Figure 3:
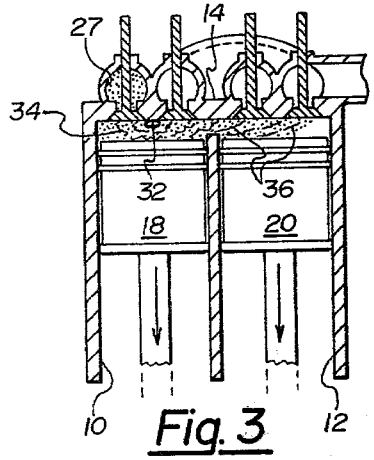
FIG. 3 is yet another view identical to FIGS. 1 and 2 but in the ignition cycle.

At the beginning of the initial cycle as shown in FIG. 3, the sparkplug 32 ignites the mixture in the first cylinder producing flaming gases 34 which are now at a very high pressure for an instant relative to the unburned air or lean mixture instantaneously intact at 36. The very hot, high pressure flaming gas from 34 thus rushes through the passageway 16 into the relatively vacant area 36 where it commingles with either fresh oxygen or a very lean mixture, enabling the partially burned fuel particles to be virtually completely oxidized into carbon dioxide.

Figure 4:
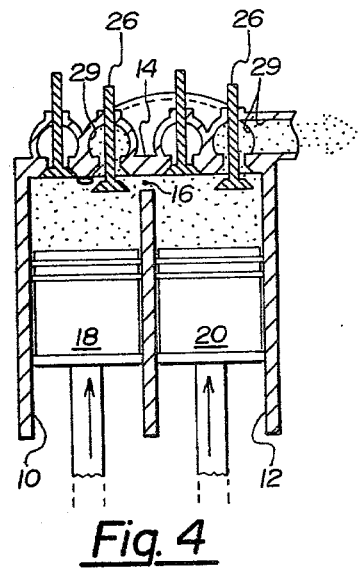
FIG. 4 is yet another drawing like FIGS. 1, 2 and 3, but in the exhaust cycle.

Simultaneously with this firing the power stroke occurs, and after the displacement downwardly of the pistons throughout the power stroke, the exhaust cycle vents the burned gases to the atmosphere as shown in FIG. 4 as in a conventional engine.

For the sake of simplicity, two pistons are shown in the drawings as this represents the minimum combination for the engine to work. Naturally it is conceived that four, six, eight or even more cylinders could be so connected for a more powerful engine.

Other possible modifications of the device are the combining of the exhaust valves into a single, probably centrally located valve to vent both cylinders simultaneously, and the possible moving of the valves, sparkplug, and passageway into slightly different relationships. The principle of the invention, of course, as described and claimed herein, is the utilization of two pistons having a common combustion chamber but being separately carbureted, with only the richer of the two cylinders being ignited.

I claim:

1. A stratified cross combination engine comprising:
   (a) a first cylinder and a second substantially identical cylinder sharing a common cylinder head which defines a common combustion chamber linking said cylinders;
   (b) a power piston operatively disposed in each of said cylinders and each piston being substantially identical to the other in diameter and displacement and means for concommitantly reciprocating said pistons substantially in phase to produce substantially identical cylinder pressures in all but the combustion cycle;
   (c) said first cylinder having an intake valve, ignition means, and means for introducing a rich fuel-air mixture therein;
   (d) said second cylinder having an intake valve and means to introduce a lean fuel air mixture therein; and (e) at least one exhaust valve disposed in one of said cylinders, whereby a rich fuel air mixture introduced into said first cylinder can be ignited, caused by the ensuing pressure increase to flow through said common combustion chamber to power the piston in said second cylinder to complete combustion prior to exhausting through said exhaust valve.

* * * * *